(12) United States Patent
Hu et al.

(10) Patent No.: US 11,811,526 B2
(45) Date of Patent: **\*Nov. 7, 2023**

(54) JOINT ENCODING SCHEMES WITH INTERLEAVER AND TONE MAPPER FOR MULTI-RU OPERATION

(71) Applicant: MediaTek Singapore Pte. Ltd., Singapore (SG)

(72) Inventors: Shengquan Hu, San Jose, CA (US); Jianhan Liu, San Jose, CA (US); Shuling Feng, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 8 days.

This patent is subject to a terminal disclaimer.

(21) Appl. No.: 17/558,194

(22) Filed: Dec. 21, 2021

(65) Prior Publication Data

US 2022/0116136 A1    Apr. 14, 2022

Related U.S. Application Data

(63) Continuation of application No. 17/022,934, filed on Sep. 16, 2020, now Pat. No. 11,239,940.

(Continued)

(51) Int. Cl.
*H04L 1/00* (2006.01)
*H04L 27/26* (2006.01)

(52) U.S. Cl.
CPC .......... *H04L 1/0033* (2013.01); *H04L 1/0009* (2013.01); *H04L 27/2626* (2013.01)

(58) Field of Classification Search
CPC ... H04L 1/0033; H04L 1/0041; H04L 1/0006; H04L 1/0009; H04L 1/0059;
(Continued)

(56) References Cited

U.S. PATENT DOCUMENTS 11,239,940 B2 * 2/2022 Hu ........................ H04L 1/0033
2015/0365263 A1 12/2015 Zhang et al.
(Continued)

FOREIGN PATENT DOCUMENTS

EP          1903735 A1     3/2008
EP          3748883 A1    12/2020
WO       2017044591 A1     3/2017

OTHER PUBLICATIONS

European Patent Office, First Office Action regarding European Patent Application No. 20197994.5, Oct. 6, 2022.

(Continued)

*Primary Examiner* — Betsy Deppe
(74) *Attorney, Agent, or Firm* — Han IP PLLC; Andy M. Han

(57) ABSTRACT

A method of joint encoding schemes with interleaver and tone mapper for multiple-resource unit (multi-RU) operation involves performing joint encoding of a plurality of information bits to generate a plurality of encoded bit sequences. The method also involves processing the plurality of encoded bit sequences by interleaving and tone mapping the encoded bit sequences with respect to a plurality of resource units (RUs) on either or both of an aggregate-RU basis and an individual-RU basis to generate a plurality of processed bit sequences. The method further involves transmitting the plurality of processed bit sequences over the plurality of RUs.

9 Claims, 16 Drawing Sheets

Related U.S. Application Data

(60) Provisional application No. 62/908,665, filed on Oct. 1, 2019.

(58) Field of Classification Search
CPC ... H04L 5/0007; H04L 5/003; H04L 27/2601; H04L 27/26261; H04L 27/2626; H03M 13/2933; H03M 13/27; H03M 13/2732
See application file for complete search history.

(56) References Cited

U.S. PATENT DOCUMENTS

| | | |
|---|---|---|
| 2018/0062899 A1 | 3/2018 | Zhang et al. |
| 2019/0238288 A1 | 8/2019 | Liu et al. |

OTHER PUBLICATIONS

Taiwan Intellectual Property Office, Office Action for Taiwan Patent Application No. 109132886, dated Jun. 30, 2021.

* cited by examiner

300 →

Table 27-34—BCC interleaver parameters

| DCM | Parameter | \multicolumn{4}{c}{RU size (tones)} | HE-SIG-A/HE-SIG-B (tones) |
|---|---|---|---|---|---|---|
| | | 26 | 52 | 106 | 242 | |
| Not used | $N_{COL}$ | 8 | 16 | 17 | 26 | 56 |
| | $N_{ROW}$ | $3 \times N_{BPSCS}$ | $3 \times N_{BPSCS}$ | $6 \times N_{BPSCS}$ | $9 \times N_{BPSCS}$ | 13 |
| | $N_{ROT}$ | 2 | 11 | 29 | 58 | $4 \times N_{BPSCS}$ |
| Used | $N_{COL}$ | 4 | 8 | 17 | 13 | - |
| | $N_{ROW}$ | $3 \times N_{BPSCS}$ | $3 \times N_{BPSCS}$ | $3 \times N_{BPSCS}$ | $9 \times N_{BPSCS}$ | 13 |
| | $N_{ROT}$ | 2 | 2 | 11 | 29 | $2 \times N_{BPSCS}$ |

(A)

Table 27-35—LDPC tone mapping distance for each RU size

| Parameter | \multicolumn{7}{c}{RU Size (tones)} |
|---|---|---|---|---|---|---|---|
| | 26 | 52 | 106 | 242 | 484 | 996 | 2×996 |
| $D_{TM}$ | 1 | 3 | 6 | 9 | 12 | 20 | 20 |
| $D_{TM\_DCM}$ | 1 | 1 | 3 | 9 | 9 | 14 | 14 |

"AGGREGATE-RU" (VIRTUAL-RU) BASED BCC INTERLEAVER PARAMETERS

RU26: $N_{SD} = 24 = 3*8 = 3*2*4 = 6*4$
RU52: $N_{SD} = 48 = 3*16 = 3*2*8 = 6*8$
RU106: $N_{SD} = 102 = 6*17$

- $N_{ROW} = 6$ FOR MULTI-RU OPERATION
- $N_{COL} = v\_N_{SD} / N_{ROW}$ (B)

"AGGREGATE-RU" (VIRTUAL-RU) BASED LDPC TONE MAPPER PARAMETERS

RU26: $N_{SD} = 24 = 3*8 = 3*2*4 = 6*4$
RU52: $N_{SD} = 48 = 3*16 = 3*2*8 = 6*8$
RU106: $N_{SD} = 102 = 6*17$
RU242: $N_{SD} = 234 = 9*26 = 9*2*13 = 6*3*13$
RU484: $N_{SD} = 468 = 12*39 = 6*2*3*13$
RU996: $N_{SD} = 980 = 20*49$

- FOR MAX{RU(i)} $<= 242$, $v\_D_{TM} = 6$
- FOR RU484 + n * RU242, $v\_D_{TM} = 18$
- FOR RU484 + n * (RU <= 106), $v\_D_{TM} = 12$
- FOR RU484 + n * RU484, $v\_D_{TM} = 18$
- FOR RU996 + RU484, $v\_D_{TM} = 8$
- FOR RU996 + RU996, $v\_D_{TM} = 20$

FIG. 5

MULTI-RU BCC INTERLEAVER PARAMETERS OPTION 1 (DCM = 0)

| MULTI-RU SIZE | v_$N_{SD}$ | $N_{ROW}$ (IN UNITS OF $N_{BPSCS}$) | $N_{COL}$ |
|---|---|---|---|
| RU26 + RU52 | 78 | 72 | 6 | 12 |
| 2 x RU52 | 104 | 96 | 6 | 16 |
| RU26 + 2 x RU52 | 130 | 120 | 6 | 20 |
| RU26 + RU106 | 132 | 126 | 6 | 21 |
| 3 x RU52 | 156 | 144 | 6 | 24 |
| RU52 + RU106 | 158 | 150 | 6 | 25 |
| 3 x RU26 + 2 x RU52 | 182 | 168 | 6 | 28 |
| 4 x RU52 | 208 | 192 | 6 | 32 |
| RU106 + 2 x RU52 | 210 | 198 | 6 | 33 |
| 2 x RU106 | 212 | 204 | 6 | 34 |

FIG. 6

MULTI-RU BCC INTERLEAVER PARAMETERS OPTION 1 (DCM = 1)

| MULTI-RU SIZE | MULTI-RU $N_{SD}$ | $v\_N_{SD}$ | $N_{ROW}$ (IN UNITS OF $N_{BPSCS}$) | $N_{COL}$ |
|---|---|---|---|---|
| RU26 + RU52 | 78 | 36 | 3 | 12 |
| 2 x RU52 | 104 | 48 | 3 | 16 |
| RU26 + 2 x RU52 | 130 | 60 | 3 | 20 |
| RU26 + RU106 | 132 | 63 | 3 | 21 |
| 3 x RU52 | 156 | 72 | 3 | 24 |
| RU52 + RU106 | 158 | 75 | 3 | 25 |
| 3 x RU26 + 2 x RU52 | 182 | 84 | 3 | 28 |
| 4 x RU52 | 208 | 96 | 3 | 32 |
| RU106 + 2 x RU52 | 210 | 99 | 3 | 33 |
| 2 x RU106 | 212 | 102 | 3 | 34 |

MULTI-RU BCC INTERLEAVER PARAMETERS OPTION 2 (DCM = 0)

| MULTI-RU SIZE | $v\_N_{SD}$ | $N_{ROW}$ (IN UNITS OF $N_{BPSCS}$) | $N_{COL}$ |
|---|---|---|---|
| RU26 + RU52 | 72 | 4 | 18 |
| 2 x RU52 | 96 | 6 | 16 |
| RU26 + 2 x RU52 | 120 | 6 | 20 |
| RU26 + RU106 | 126 | 6 | 21 |
| 3 x RU52 | 144 | 8 | 24 |
| RU52 + RU106 | 150 | 6 | 25 |
| 3 x RU26 + 2 x RU52 | 168 | 8 | 28 |
| 4 x RU52 | 192 | 8 | 32 |
| RU106 + 2 x RU52 | 198 | 9 | 33 |
| 2 x RU106 | 204 | 6 | 34 |

MULTI-RU BCC INTERLEAVER PARAMETERS OPTION 2 (DCM = 1)

| MULTI-RU SIZE | v_$N_{SD}$ | $N_{ROW}$ (IN UNITS OF $N_{BPSCS}$) | $N_{COL}$ |
|---|---|---|---|
| RU26 + RU52 | 78 | 36 | 2 | 18 |
| 2 x RU52 | 104 | 48 | 3 | 16 |
| RU26 + 2 x RU52 | 130 | 60 | 3 | 20 |
| RU26 + RU106 | 132 | 63 | 3 | 21 |
| 3 x RU52 | 156 | 72 | 4 | 18 |
| RU52 + RU106 | 158 | 75 | 3 | 25 |
| 3 x RU26 + 2 x RU52 | 182 | 84 | 4 | 21 |
| 4 x RU52 | 208 | 96 | 4 | 24 |
| RU106 + 2 x RU52 | 210 | 99 | 3 | 33 |
| 2 x RU106 | 212 | 102 | 6 | 17 |

FIG. 9

MULTI-RU LDPC TONE MAPPER PARAMETERS OPTION 1 (DCM = 0)

| MULTI-RU SIZE | | $v\_N_{SD}$ | $D_{TM}$ |
|---|---|---|---|
| RU26 + RU52 | 78 | 72 | 6 |
| 2 × RU52 | 104 | 96 | 6 |
| RU26 + 2 × RU52 | 130 | 120 | 6 |
| RU26 + RU106 | 132 | 126 | 6 |
| 3 × RU52 | 156 | 144 | 6 |
| RU52 + RU106 | 158 | 150 | 6 |
| 3 × RU26 + 2 × RU52 | 182 | 168 | 6 |
| 4 × RU52 | 208 | 192 | 6 |
| RU106 + 2 × RU52 | 210 | 198 | 6 |
| 2 × RU106 | 212 | 204 | 6 |
| RU106 + RU242 | 348 | 336 | 6 |
| RU242 + RU242 | 484 | 468 | 12 |
| RU106 + RU484 | 590 | 570 | 15 |
| RU242 + RU484 | 726 | 702 | 18 |
| RU484 + RU484 | 968 | 936 | 18 |

FIG. 10

MULTI-RU LDPC TONE MAPPER PARAMETERS OPTION 2 (DCM = 0)

| MULTI-RU SIZE | | v_N$_{SD}$ | D$_{TM}$ |
|---|---|---|---|
| RU26 + RU52 | 78 | 72 | 4 |
| 2 x RU52 | 104 | 96 | 4 |
| RU26 + 2 x RU52 | 130 | 120 | 6 |
| RU26 + RU106 | 132 | 126 | 6 |
| 3 x RU52 | 156 | 144 | 6 |
| RU52 + RU106 | 158 | 150 | 6 |
| 3 x RU26 + 2 x RU52 | 182 | 168 | 7 |
| 4 x RU52 | 208 | 192 | 8 |
| RU106 + 2 x RU52 | 210 | 198 | 9 |
| 2 x RU106 | 212 | 204 | 12 |
| RU106 + RU242 | 348 | 336 | 12 |
| RU242 + RU242 | 484 | 468 | 12 |
| RU106 + RU484 | 590 | 570 | 15 |
| RU242 + RU484 | 726 | 702 | 18 |
| RU484 + RU484 | 968 | 936 | 18 |

FIG. 11

MULTI-RU LDPC TONE MAPPER PARAMETERS OPTION (DCM = 1)

| MULTI-RU SIZE | | $v\_N_{SD}$ | $D_{TM\_DCM}$ |
|---|---|---|---|
| RU26 + RU52 | 78 | 36 | 3 |
| 2 × RU52 | 104 | 48 | 3 |
| RU26 + 2 × RU52 | 130 | 60 | 3 |
| RU26 + RU106 | 132 | 63 | 3 |
| 3 × RU52 | 156 | 72 | 3 |
| RU52 + RU106 | 158 | 75 | 3 |
| 3 × RU26 + 2 × RU52 | 182 | 84 | 3 |
| 4 × RU52 | 208 | 96 | 3 |
| RU106 + 2 × RU52 | 210 | 99 | 3 |
| 2 × RU106 | 212 | 102 | 3 |
| RU106 + RU242 | 348 | 168 | 3 |
| RU242 + RU242 | 484 | 234 | 6 |
| RU106 + RU484 | 590 | 285 | 5 |
| RU242 + RU484 | 726 | 351 | 9 |
| RU484 + RU484 | 968 | 468 | 9 |

PERFORM, BY A PROCESSOR OF AN APPARATUS, JOINT ENCODING OF A PLURALITY OF INFORMATION BITS TO GENERATE A PLURALITY OF ENCODED BIT SEQUENCES
1510

PROCESS, BY THE PROCESSOR, THE PLURALITY OF ENCODED BIT SEQUENCES BY INTERLEAVING AND TONE MAPPING THE ENCODED BIT SEQUENCES WITH RESPECT TO A PLURALITY OF RESOURCE UNITS (RUS) ALLOCATED TO THE APPARATUS ON AN AGGREGATE-RU BASIS TO GENERATE A PLURALITY OF PROCESSED BIT SEQUENCES
1520

INTERLEAVE, BY AN INTERLEAVER OF THE PROCESSOR, THE PLURALITY OF ENCODED BIT SEQUENCES WITH RESPECT TO AN AGGREGATE OF THE PLURALITY OF RUS TO PROVIDE A PLURALITY OF INTERLEAVED BIT SEQUENCES
1522

TONE MAP, BY A TONE MAPPER OF THE PROCESSOR, THE PLURALITY OF INTERLEAVED BIT SEQUENCES WITH RESPECT TO THE AGGREGATE OF THE PLURALITY OF RUS TO PROVIDE THE PLURALITY OF PROCESSED BIT SEQUENCES
1524

PARSE, BY A PARSER OF THE PROCESSOR, THE PLURALITY OF PROCESSED BIT SEQUENCES
1526

TRANSMIT, BY THE PROCESSOR, THE PLURALITY OF PROCESSED BIT SEQUENCES OVER THE PLURALITY OF RUS
1530

PERFORM, BY A PROCESSOR OF AN APPARATUS, JOINT ENCODING OF A PLURALITY OF INFORMATION BITS TO GENERATE A PLURALITY OF ENCODED BIT SEQUENCES
1610

PROCESS, BY THE PROCESSOR, THE PLURALITY OF ENCODED BIT SEQUENCES BY INTERLEAVING AND TONE MAPPING THE ENCODED BIT SEQUENCES WITH RESPECT TO A PLURALITY OF RESOURCE UNITS (RUs) ALLOCATED TO THE APPARATUS ON AN INDIVIDUAL-RU BASIS TO GENERATE A PLURALITY OF PROCESSED BIT SEQUENCES
1620

PARSE, BY A PARSER OF THE PROCESSOR, THE PLURALITY OF ENCODED BIT SEQUENCES TO A PLURALITY OF INTERLEAVERS OF THE PROCESSOR EACH OF WHICH CORRESPONDING TO A RESPECTIVE ONE OF THE PLURALITY OF RUs
1622

INTERLEAVE, BY EACH OF THE PLURALITY OF INTERLEAVERS, A RESPECTIVE ENCODED BIT SEQUENCE FROM THE PLURALITY OF ENCODED BIT SEQUENCES TO PROVIDE A RESPECTIVE INTERLEAVED BIT SEQUENCE TO A RESPECTIVE ONE OF A PLURALITY OF TONE MAPPERS OF THE PROCESSOR EACH OF WHICH CORRESPONDING TO A RESPECTIVE ONE OF THE PLURALITY OF RUs
1624

TONE MAP, BY EACH OF THE PLURALITY OF TONE MAPPERS, THE RESPECTIVE INTERLEAVED BIT SEQUENCE TO PROVIDE A RESPECTIVE PROCESSED BIT SEQUENCE OF THE PLURALITY OF PROCESSED BIT SEQUENCES
1626

TRANSMIT, BY THE PROCESSOR, THE PLURALITY OF PROCESSED BIT SEQUENCES OVER THE PLURALITY OF RUs
1630

FIG. 16

JOINT ENCODING SCHEMES WITH INTERLEAVER AND TONE MAPPER FOR MULTI-RU OPERATION

CROSS REFERENCE TO RELATED PATENT APPLICATION

The present disclosure is part of a continuation of U.S. patent application Ser. No. 17/022,934, filed 16 Sep. 2020, which claims the priority benefit of U.S. Provisional Patent Application Nos. 62/908,665, filed 1 Oct. 2019. Contents of aforementioned applications are herein incorporated by reference in their entirety.

TECHNICAL FIELD

The present disclosure is generally related to wireless communications and, more particularly, to joint encoding schemes with interleaver and tone mapper for multiple-resource unit (multi-RU) operation.

BACKGROUND

Unless otherwise indicated herein, approaches described in this section are not prior art to the claims listed below and are not admitted as prior art by inclusion in this section.

In order to achieve better efficiency in spectrum utilization as well as to achieve frequency diversity for improved link quality, multi-RU allocation for a single station (STA) has been adopted in the next-generation wireless local area network (WLAN) standard Institute of Electrical and Electronics Engineers (IEEE) 802.11be for extreme high-throughput (EHT) wireless communications. With multi-RU, the STA would be allowed to receive and/or transmit using more than one RU. There are several technical issues to be addressed in order to implement multi-RU operations such as, for example, how to encode information and how to interleave and tone map to multiple RUs. For binary convolutional codes (BCC) encoding of multi-RU operations, encoded bits would need to go through a BCC interleaver. On the other hand, for low-density parity-check (LDPC) encoding of multi-RU operations, the encoded bits would be modulated and then go through an LDPC tone mapper. However, how the BCC interleaver and LDPC tone mapper are implemented remains to be defined or otherwise designed by individual vendors.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to joint encoding schemes with interleaver and tone mapper for multi-RU operation.

In one aspect, a method may involve performing joint encoding of a plurality of information bits to generate a plurality of encoded bit sequences. The method may also involve processing the plurality of encoded bit sequences by interleaving and tone mapping the encoded bit sequences with respect to a plurality of RUs on either or both of an aggregate-RU basis and an individual-RU basis to generate a plurality of processed bit sequences. The method may further involve transmitting the plurality of processed bit sequences over the plurality of RUs.

In another aspect, a method may involve a processor of an apparatus performing joint encoding of a plurality of information bits to generate a plurality of encoded bit sequences. The method may also involve the processor processing the plurality of encoded bit sequences by interleaving and tone mapping the encoded bit sequences with respect to a plurality of RUs allocated to the apparatus on an aggregate-RU basis to generate a plurality of processed bit sequences by: (a) interleaving, by an interleaver of the processor, the plurality of encoded bit sequences with respect to an aggregate of the plurality of RUs to provide a plurality of interleaved bit sequences; (b) tone mapping, by a tone mapper of the processor, the plurality of interleaved bit sequences with respect to the aggregate of the plurality of RUs to provide the plurality of processed bit sequences; and (c) parsing, by a parser of the processor, the plurality of processed bit sequences.

In yet another aspect, a method may involve a processor of an apparatus performing joint encoding of a plurality of information bits to generate a plurality of encoded bit sequences. The method may also involve the processor processing the plurality of encoded bit sequences by interleaving and tone mapping the encoded bit sequences with respect to a plurality of RUs allocated to the apparatus on an individual-RU basis to generate a plurality of processed bit sequences by: (a) parsing, by a parser of the processor, the plurality of encoded bit sequences to a plurality of interleavers of the processor each of which corresponding to a respective one of the plurality of RUs; (b) interleaving, by each of the plurality of interleavers, a respective encoded bit sequence from the plurality of encoded bit sequences to provide a respective interleaved bit sequence to a respective one of a plurality of tone mappers of the processor each of which corresponding to a respective one of the plurality of RUs; and (c) tone mapping, by each of the plurality of tone mappers, the respective interleaved bit sequence to provide a respective processed bit sequence of the plurality of processed bit sequences.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 3 is a diagram of an example scenario in accordance with the present disclosure.

FIG. 5 is a diagram of an example scenario in accordance with the present disclosure.

FIG. 6 is a diagram of an example scenario in accordance with the present disclosure.

FIG. 7 is a diagram of an example scenario in accordance with the present disclosure.

FIG. 8 is a diagram of an example scenario in accordance with the present disclosure.

FIG. 9 is a diagram of an example scenario in accordance with the present disclosure.

FIG. 10 is a diagram of an example scenario in accordance with the present disclosure.

FIG. 11 is a diagram of an example scenario in accordance with the present disclosure.

FIG. 12 is a diagram of an example scenario in accordance with the present disclosure.

FIG. 15 is a flowchart of an example process in accordance with an implementation of the present disclosure.

FIG. 16 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to joint encoding schemes with interleaver and tone mapper for multi-RU operation in wireless communications. According to the present disclosure, a number of possible solutions may be implemented separately or jointly. That is, although these possible solutions may be described below separately, two or more of these possible solutions may be implemented in one combination or another.

Figure 1:
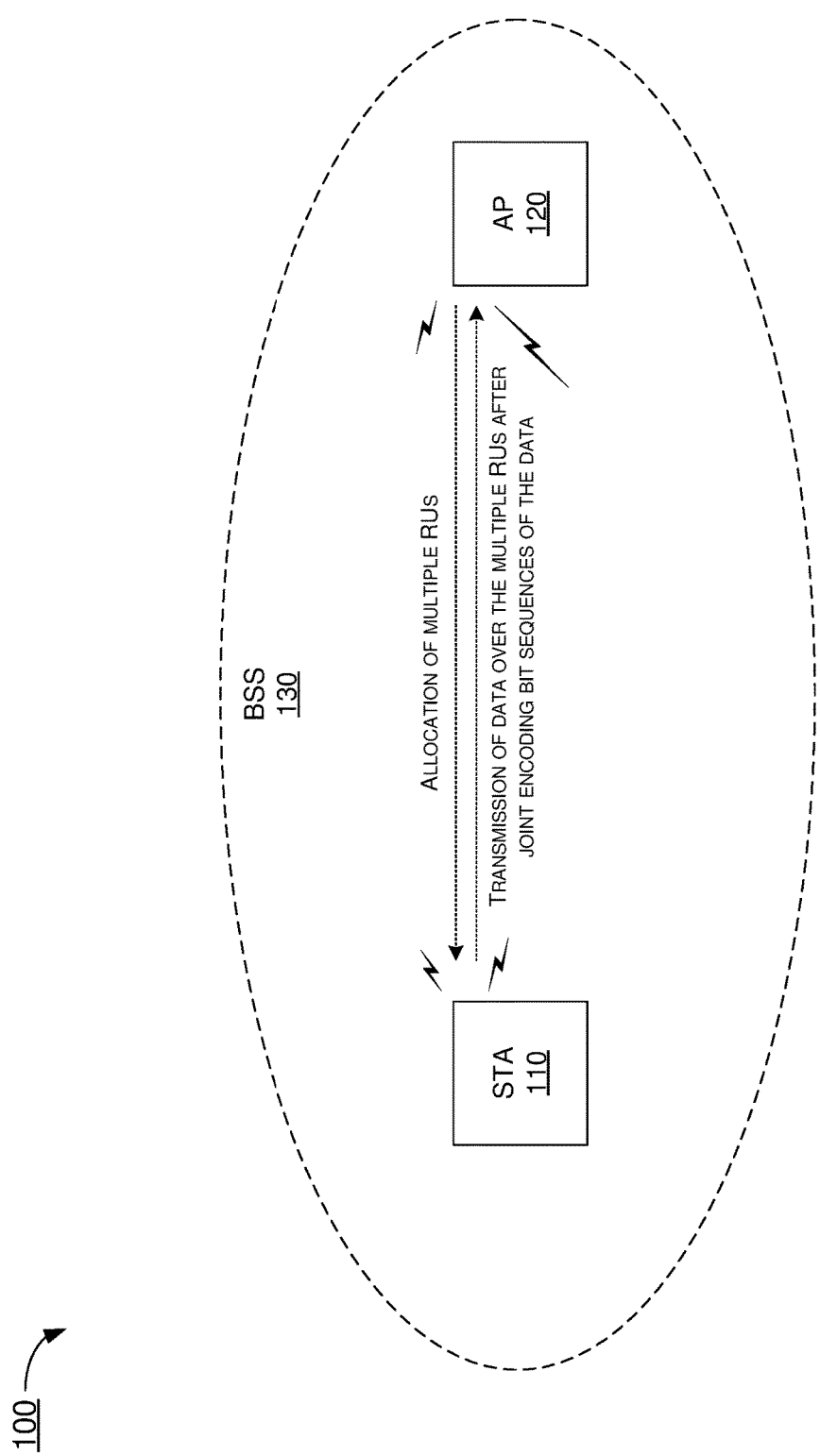
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 12 illustrate examples of implementation of various proposed schemes in network environment 100 in accordance with the present disclosure. The following description of various proposed schemes is provided with reference to FIG. 1~FIG. 12.

Referring to FIG. 1, network environment 100 may involve at least a STA 110 which is associated with, and communicating wirelessly with, an access point (AP) 120 in a basic service set (BSS) 130 in accordance with one or more IEEE 802.11 standards (e.g., IEEE 802.11ax, IEEE 802.11be and future-developed standards). STA 110 may be allocated by AP 120 multiple RUs for multi-RU operation in that STA 110 may receive and transmit using the allocated multiple RUs. Under various proposed schemes in accordance with the present disclosure, STA 110 and AP 120 may be configured to perform joint encoding schemes with interleaver and tone mapper for multi-RU operation in wireless communications in accordance with various proposed schemes described below.

For multi-RU operations, any of a number of approaches may be utilized, including independent encoding per RU, joint encoding across multiple RUs, and mixed encoding involving a combination of independent encoding per RU and joint encoding across multiple RUs. For joint and/or mixed encoding approaches, a new concept of "aggregate RU" (herein interchangeably referred as "virtual RU") may be utilized in pre-forward error correction (pre-FEC) padding, post-FEC padding and encoding process for multi-RU operations under various proposed schemes in accordance with the present disclosure. For instance, for BCC encoding of multiple RUs (assuming the size of virtual RU is less than or equal to 242), the encoded bits would be processed by BCC interleaver(s) through which interleaving may be performed on either an individual-RU (herein interchangeably referred as "physical-RU") basis or an aggregate-RU (herein interchangeably referred as "virtual-RU") basis. Similarly, for LDPC encoding of multiple RUs, the encoded bits would be modulated and the processed by LDPC tone mapper(s) through which tone mapping may be performed on either the individual-RU (or physical-RU) basis or the aggregate-RU (or virtual-RU) basis. The term "aggregate RU" (or "virtual RU") herein refers to an aggregate or combination of two or more physical RUs (e.g., a 26-tone RU and a 52-tone RU with total 78 tones), and the term "individual RU" (or "physical RU") herein refers to an individual RU with one or more tones (e.g., as defined under IEEE 802.11ax).

Figure 2:
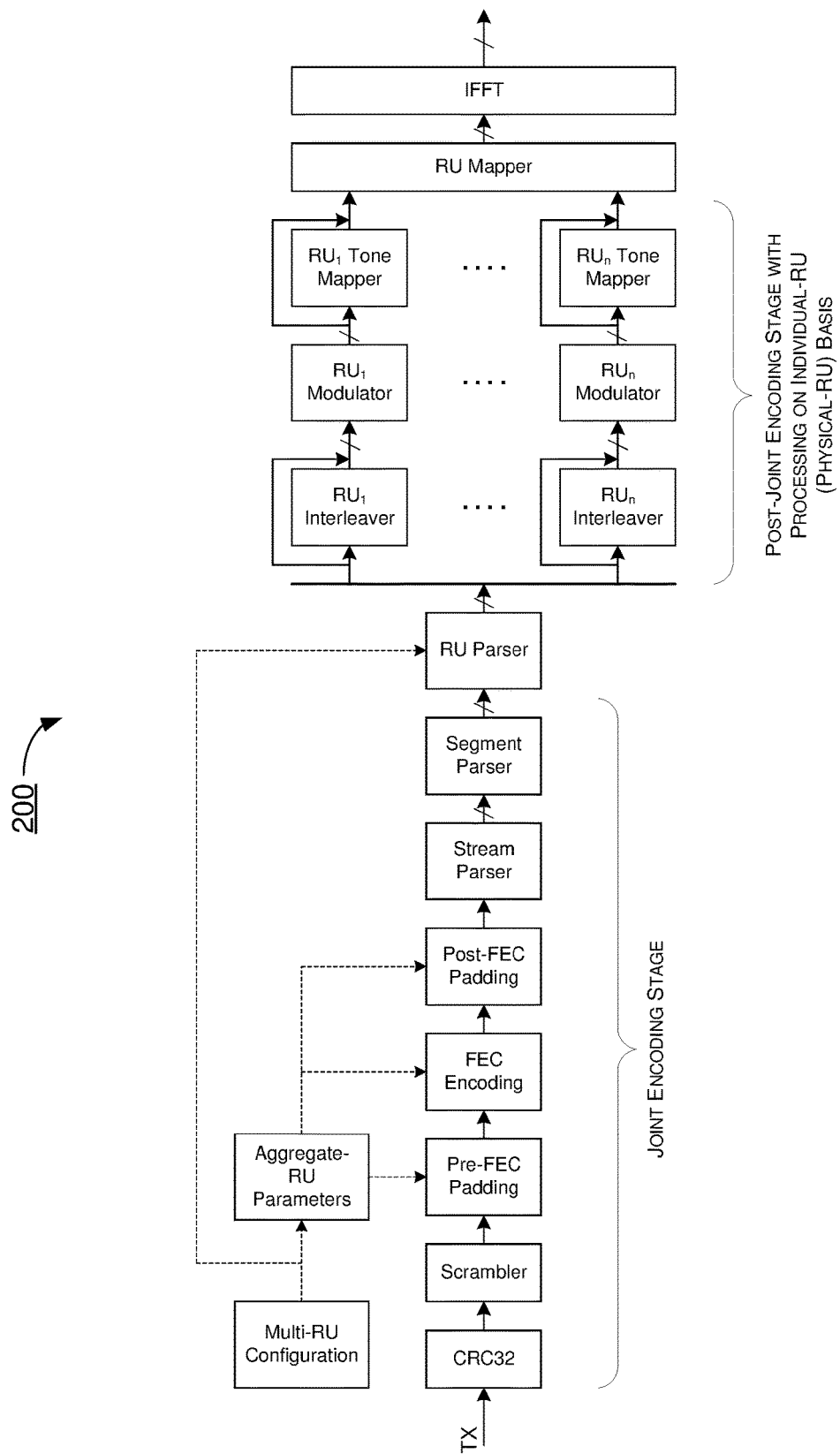
FIG. 2 is a diagram of an example design in accordance with the present disclosure.

FIG. 2 illustrates an example design 200 in accordance with the present disclosure. Design 200 may be a design or configuration of electronic circuitry in STA 110 for multi-RU operations with processing of bit sequences on an individual-RU (or physical-RU) basis. Referring to FIG. 2, design 200 may include a joint encoding stage and a post-joint encoding stage. The post-joint encoding stage may process multiple RUs on an individual-RU (or physical-RU) basis. The joint encoding stage may involve various functional blocks in series including, for example, a cyclic redundancy check (CRC32) function, which converts a variable-length string into a 32-bit binary sequence, followed by a scrambler, followed by a pre-FEC padding block, followed by a FEC encoding block, followed by a post-FEC padding block, followed by a stream parser, followed by a segment parser, followed by an RU parser. The joint encoding stage may receive, for transmission (TX), a plurality or a string of information bits and perform joint encoding thereon to generate a plurality or a string of encoded bit sequences. The joint encoding stage may also include additional functional blocks such as a multi-RU configuration block and an aggregate-RU parameter selection block. The multi-RU configuration block may provide configuration information to the aggregate-RU parameter selection block as well as the RU parser. Based on the configuration information, the aggregate-RU parameter selection block may select a corresponding set of parameters from a plurality of possible sets of parameters and provide the selected set of parameters to the pre-FEC padding block, the FEC encoding block, the post-FEC padding block and the RU parser.

The post-joint encoding stage may include n individual-RU processing sets, with n being a positive integer greater than 1 and representing the number of RUs of the multiple RUs (e.g., $RU_1 \sim RU_n$) allocated to STA 110. Each individual-RU processing set may include a $Ru_i$ interleaver, followed by a $Ru_i$ modulator, followed by a $Ru_i$ tone mapper, with $1 \leq i \leq n$. The n individual-RU processing sets may process the plurality of encoded bit sequences generated by the joint encoding stage. Specifically, the n individual-RU processing sets may process the plurality of encoded bit sequences by interleaving and tone mapping the encoded bit sequences with respect to the n RUs allocated to STA 110 on an individual-RU (physical-RU) basis to generate a plurality of processed bit sequences. In particular, the RU parser may parse the plurality of encoded bit sequences to the $RU_1 \sim RU_n$ interleavers each of which, in turn, may interleave a respective encoded bit sequence from the plurality of encoded bit sequences to provide a respective interleaved bit sequence, via a respective one of the $RU_1 \sim RU_n$ modulators, to a respective one of the $RU_1 \sim RU_n$ tone mappers. Each of the $RU_1 \sim RU_n$ tone mappers may tone map the respective interleaved bit sequence to provide a respective processed bit sequence of the plurality of processed bit sequences. The processed bit sequences may then be mapped by a RU mapper and provided to an inverse fast Fourier transform (IFFT) functional block which converts one or more signals represented by the processed bit sequences from the frequency domain to the time domain for transmission by one or more antennas as radio frequency (RF) waves.

Under a proposed scheme in accordance with the present disclosure, each of the $RU_1 \sim RU_n$ interleavers may be a BCC interleaver and each of the $RU_1 \sim RU_n$ tone mappers may be an LDPC tone mapper. Under the proposed scheme, interleaver parameters as defined in the IEEE 802.11ax specification (e.g., in Table 27-34) may be utilized by each of the $RU_1 \sim RU_n$ interleavers in interleaving the respective encoded bit sequence on the individual-RU (or physical-RU) basis. Similarly, tone mapper parameters as defined in the IEEE 802.11ax specification (e.g., in Table 27-35) may be utilized by each of the $RU_1 \sim RU_n$ tone mappers in tone mapping the respective encoded bit sequence on the individual-RU (or physical-RU) basis.

FIG. 3 illustrates an example scenario 300 in accordance with the present disclosure. Referring to FIG. 3, the interleaver parameters as defined in Table 27-34 of the IEEE 802.11ax specification may be utilized by each of the $RU_1 \sim RU_n$ interleavers of design 200 in interleaving the respective encoded bit sequence on the individual-RU (or physical-RU) basis. Likewise, the tone mapper parameters as defined in Table 27-35 of the IEEE 802.11ax specification may be utilized by each of the $RU_1 \sim RU_n$ tone mappers of design 200 in tone mapping the respective encoded bit sequence on the individual-RU (or physical-RU) basis.

Figure 4:
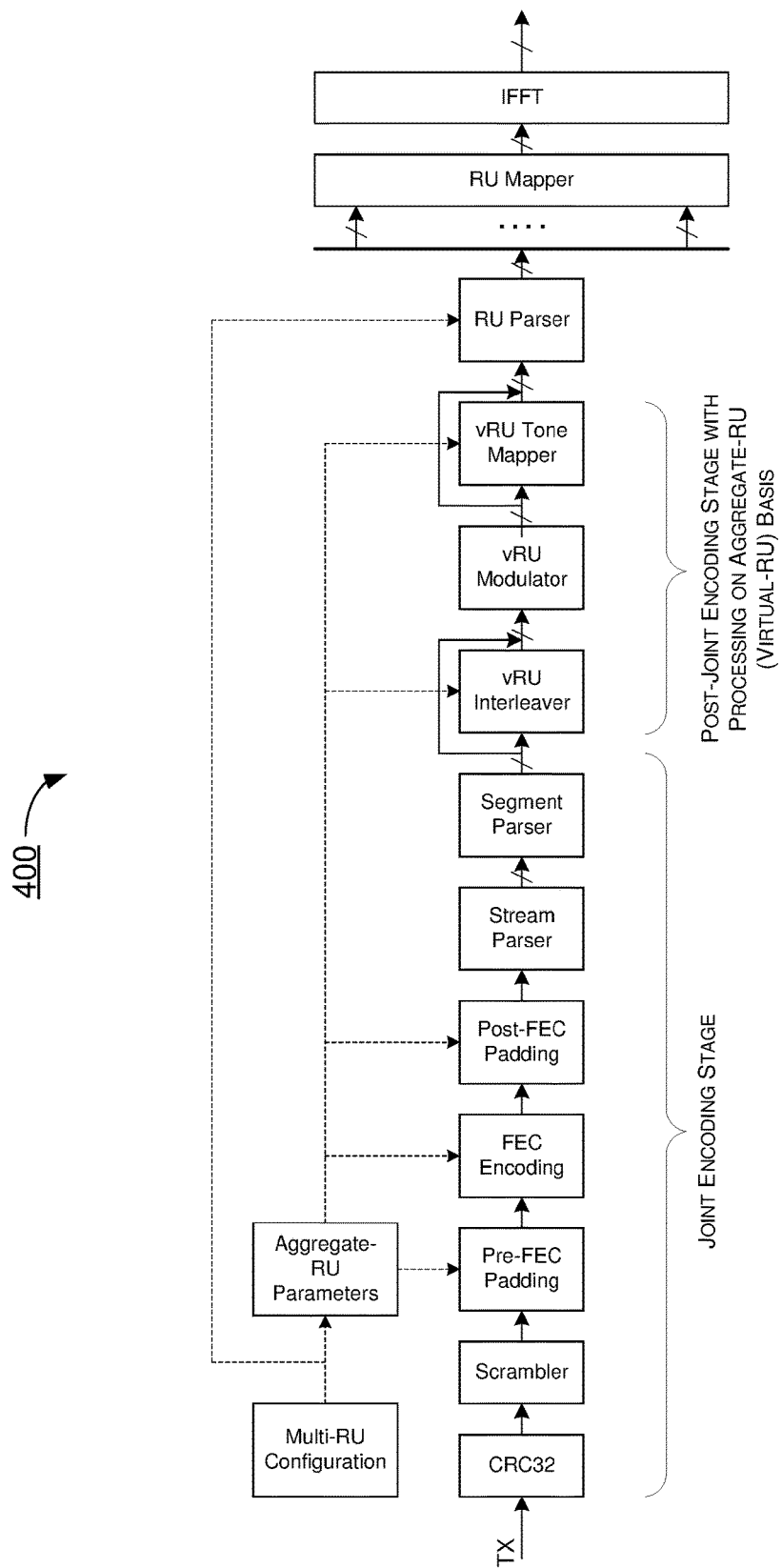
FIG. 4 is a diagram of an example design in accordance with the present disclosure.

FIG. 4 illustrates an example design 400 in accordance with the present disclosure. Design 400 may be a design or configuration of electronic circuitry in STA 110 for multi-RU operations with processing of bit sequences on an aggregate-RU (or virtual-RU) basis.

Referring to FIG. 4, design 400 may include a joint encoding stage and a post-joint encoding stage. The post-joint encoding stage may process multiple RUs on an aggregate-RU (or virtual-RU) basis. The joint encoding stage may involve various functional blocks in series including, for example, a CRC32 function, which converts a variable-length string into a 32-bit binary sequence, followed by a scrambler, followed by a pre-FEC padding block, followed by a FEC encoding block, followed by a post-FEC padding block, followed by a stream parser, followed by a segment parser. The joint encoding stage may receive, for transmission (TX), a plurality or a string of information bits and perform joint encoding thereon to generate a plurality or a string of encoded bit sequences. The joint encoding stage may also include additional functional blocks such as a multi-RU configuration block and an aggregate-RU parameter selection block. The multi-RU configuration block may provide configuration information to the aggregate-RU parameter selection block as well as the RU parser. Based on the configuration information, the aggregate-RU parameter selection block may select a corresponding set of parameters from a plurality of possible sets of parameters and provide the selected set of parameters to the pre-FEC padding block, the FEC encoding block, the post-FEC padding block and various functional blocks of the post-joint encoding stage.

The post-joint encoding stage may include a virtual RU (vRU) interleaver, followed by a vRU modulator, followed by a vRU tone mapper, followed by a RU parser. The post-joint encoding stage may process the plurality of encoded bit sequences by interleaving and tone mapping the encoded bit sequences with respect to the plurality of RUs (e.g., n RUs) allocated to STA 110 on an aggregate-RU (virtual-RU) basis to generate a plurality of processed bit sequences. In particular, the vRU interleaver may interleave the plurality of encoded bit sequences with respect to an aggregate of the plurality of RUs to provide a plurality of interleaved bit sequences, via the vRU modulator, to the vRU tone mapper. The vRU tone mapper may tone map the plurality of interleaved bit sequences with respect to the aggregate of the plurality of RUs to provide the plurality of processed bit sequences to the RU parser. The RU parser may parse the plurality of processed bit sequences. The processed bit sequences may then be mapped by a RU mapper and provided to an IFFT functional block which converts one or more signals represented by the processed bit sequences from the frequency domain to the time domain for transmission by one or more antennas as RF waves.

Under a proposed scheme in accordance with the present disclosure, the vRU interleaver may be a BCC interleaver and the vRU tone mapper may be an LDPC tone mapper. Under the proposed scheme, the vRU interleaver may interleave the plurality of encoded bit sequences on the aggregate-RU (or virtual-RU) basis by using any set of interleaver parameters among a plurality of sets of interleaver parameters shown in FIG. 5~FIG. 9. For example, the vRU interleaver may utilize a set of parameters corresponding to a 26-tone RU and a 106-tone RU for a total of 132 data subcarriers (e.g., $N_{sd}$=132), with a number of interleaver matrix columns being 21 (e.g., $N_{col}$=21) and a number of interleaver matrix rows being a multiple of 6 (e.g., $N_{row}$=6*a number of coded bits per single carrier for each spatial stream ($N_{bpscs}$)). Similarly, the vRU tone mapper may tone map the plurality of interleaved bit sequences on the aggregate-RU (or virtual-RU) basis by using any set of tone mapper parameters among a plurality of sets of tone mapper parameters shown in FIG. 5 and FIG. 10–FIG. 12. For example, the vRU tone mapper may utilize a set of parameters corresponding to a 106-tone RU and a 26-tone RU, with a distance between tones being 6 (e.g., $D_{TM}=6$). Alternatively, as another example, the vRU tone mapper may utilize a set of parameters corresponding to a 484-tone RU and a 242-tone RU, with a distance between tones being 18 (e.g., $D_{TM}=18$).

FIG. 5 illustrates an example scenario 500 in accordance with the present disclosure. Referring to FIG. 5, scenario 500 shows some possible sets of interleaver parameters and some possible sets of tone mapper parameters that may be utilized by the vRU interleaver and the vRU tone mapper of design 400, respectively. It is noteworthy that, for smaller-size RUs (e.g., less than 242 tones), the RUs may be contiguous to one another in the frequency domain, while larger-size RUs may not necessarily be contiguous in the frequency domain.

FIG. 6 illustrates an example scenario 600 in accordance with the present disclosure. Referring to FIG. 6, scenario 600 shows some possible sets of interleaver parameters without dual carrier modulation (DCM), or DCM=0. FIG. 7 illustrates an example scenario 700 in accordance with the present disclosure. Referring to FIG. 7, scenario 700 shows some possible sets of interleaver parameters with DCM, or DCM=1. FIG. 8 illustrates an example scenario 800 in accordance with the present disclosure. Referring to FIG. 8, scenario 800 shows some possible sets of interleaver parameters without DCM, or DCM=0. FIG. 9 illustrates an example scenario 900 in accordance with the present disclosure. Referring to FIG. 9, scenario 900 shows some possible sets of interleaver parameters with DCM, or DCM=1. FIG. 10 illustrates an example scenario 1000 in accordance with the present disclosure. Referring to FIG. 10, scenario 1000 shows some possible sets of tone mapper parameters without DCM, or DCM=0. FIG. 11 illustrates an example scenario 1100 in accordance with the present disclosure. Referring to FIG. 11, scenario 1100 shows some possible sets of tone mapper parameters without DCM, or DCM=0. FIG. 12 illustrates an example scenario 1200 in accordance with the present disclosure.

Referring to FIG. 12, scenario 1200 shows some possible sets of tone mapper parameters with DCM, or DCM=1.

Illustrative Implementations

Figure 13:
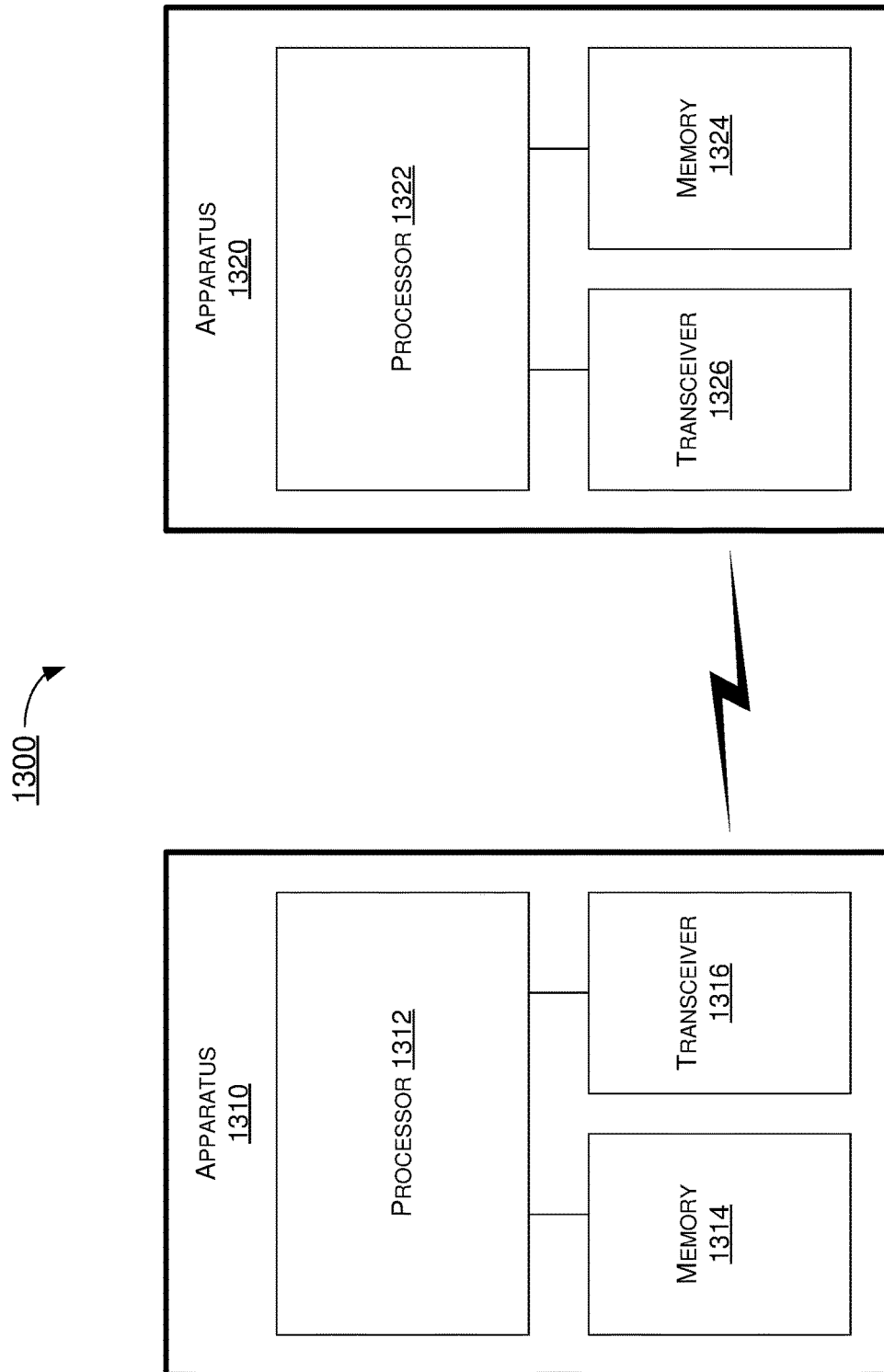
FIG. 13 is a block diagram of an example communication system in accordance with an implementation of the present disclosure.

FIG. 13 illustrates an example system 1300 having at least an example apparatus 1310 and an example apparatus 1320 in accordance with an implementation of the present disclosure. Each of apparatus 1310 and apparatus 1320 may perform various functions to implement schemes, techniques, processes and methods described herein pertaining to joint encoding schemes with interleaver and tone mapper for multi-RU operation in wireless communications, including the various schemes described above with respect to various proposed designs, concepts, schemes, systems and methods described above as well as processes described below. For instance, apparatus 1310 may be implemented in STA 110 and apparatus 1320 may be implemented in AP 120, or vice versa.

Each of apparatus 1310 and apparatus 1320 may be a part of an electronic apparatus, which may be a STA or an AP, such as a portable or mobile apparatus, a wearable apparatus, a wireless communication apparatus or a computing apparatus. When implemented in a STA, each of apparatus 1310 and apparatus 1320 may be implemented in a smartphone, a smart watch, a personal digital assistant, a digital camera, or a computing equipment such as a tablet computer, a laptop computer or a notebook computer. Each of apparatus 1310 and apparatus 1320 may also be a part of a machine-type apparatus, which may be an IoT apparatus such as an immobile or a stationary apparatus, a home apparatus, a wire communication apparatus or a computing apparatus. For instance, each of apparatus 1310 and apparatus 1320 may be implemented in a smart thermostat, a smart fridge, a smart door lock, a wireless speaker or a home control center. When implemented in or as a network apparatus, apparatus 1310 and/or apparatus 1320 may be implemented in a network node, such as an AP in a WLAN.

In some implementations, each of apparatus 1310 and apparatus 1320 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1310 and apparatus 1320 may be implemented in or as a STA or an AP. Each of apparatus 1310 and apparatus 1320 may include at least some of those components shown in FIG. 13 such as a processor 1312 and a processor 1322, respectively, for example. Each of apparatus 1310 and apparatus 1320 may further include one or more other components not pertinent to the proposed scheme of the present disclosure (e.g., internal power supply, display device and/or user interface device), and, thus, such component(s) of apparatus 1310 and apparatus 1320 are neither shown in FIG. 13 nor described below in the interest of simplicity and brevity.

In one aspect, each of processor 1312 and processor 1322 may be implemented in the form of one or more single-core processors, one or more multi-core processors, one or more RISC processors or one or more CISC processors. That is, even though a singular term "a processor" is used herein to refer to processor 1312 and processor 1322, each of processor 1312 and processor 1322 may include multiple processors in some implementations and a single processor in other implementations in accordance with the present disclosure. In another aspect, each of processor 1312 and processor 1322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1312 and processor 1322 is a special-purpose machine specifically designed, arranged and configured to perform specific tasks including those pertaining to joint encoding schemes with interleaver and tone mapper for multi-RU operation in wireless communications in accordance with various implementations of the present disclosure. For instance, each of processor 1312 and processor 1322 may be configured with hardware, electronic components and/or circuitry arranged in design 200 and design 400 (e.g., one or more encoding/processing pipelines of circuitry according to design 200 and one or more encoding/processing pipelines of circuitry according to design 400).

In some implementations, apparatus 1310 may also include a transceiver 1316 coupled to processor 1312. Transceiver 1316 may include a transmitter capable of wirelessly transmitting and a receiver capable of wirelessly receiving data. In some implementations, apparatus 1320 may also include a transceiver 1326 coupled to processor 1322. Transceiver 1326 may include a transmitter capable of wirelessly transmitting and a receiver capable of wirelessly receiving data. It is noteworthy that, although transceiver 1316 and transceiver 1326 are illustrated as being external to and separate from processor 1312 and processor 1322, respectively, in some implementations, transceiver 1316 may be an integral part of processor 1312 as a system on chip (SoC) and/or transceiver 1326 may be an integral part of processor 1322 as a SoC.

In some implementations, apparatus 1310 may further include a memory 1314 coupled to processor 1312 and capable of being accessed by processor 1312 and storing data therein. In some implementations, apparatus 1320 may further include a memory 1324 coupled to processor 1322 and capable of being accessed by processor 1322 and storing data therein. Each of memory 1314 and memory 1324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1314 and memory 1324 may include a type of read-only memory (ROM) such as mask ROM, programmable ROM (PROM), erasable programmable ROM (EPROM) and/or electrically erasable programmable ROM (EEPROM). Alternatively, or additionally, each of memory 1314 and memory 1324 may include a type of non-volatile random-access memory (NVRAM) such as flash memory, solid-state memory, ferroelectric RAM (FeRAM), magnetoresistive RAM (MRAM) and/or phase-change memory.

Each of apparatus 1310 and apparatus 1320 may be a communication entity capable of communicating with each other using various proposed schemes in accordance with the present disclosure. For illustrative purposes and without limitation, a description of capabilities of apparatus 1310, as STA 110, and apparatus 1320, as AP 120, is provided below. It is noteworthy that, although a detailed description of capabilities, functionalities and/or technical features of apparatus 1310 is provided below, the same may be applied to apparatus 1320 although a detailed description thereof is not provided solely in the interest of brevity. It is also noteworthy that, although the example implementations described below are provided in the context of WLAN, the same may be implemented in other types of networks.

Under a proposed scheme pertaining to joint encoding schemes with interleaver and tone mapper for multi-RU operation in accordance with the present disclosure, with apparatus 1310 implemented in or as STA 110 and apparatus 1320 implemented in or as AP 120 associated with a BSS (e.g., BSS 130) of a wireless network such as a WLAN in network environment 100 in accordance with one or more of IEEE 802.11 standards, processor 1312 of apparatus 1310 may perform joint encoding of a plurality of information bits to generate a plurality of encoded bit sequences. Additionally, processor 1312 may process the plurality of encoded bit sequences by interleaving and tone mapping the encoded bit sequences with respect to a plurality of RUs (e.g., allocated to apparatus 1310 by apparatus 1320 as AP 120) on either or both of an aggregate-RU (or virtual-RU) basis and an individual-RU (or physical-RU) basis to generate a plurality of processed bit sequences. Moreover, processor 1312 may transmit, via transceiver 1316, the plurality of processed bit sequences to apparatus 1320 over the plurality of RUs.

In some implementations, in processing the plurality of encoded bit sequences, processor 1312 may interleave and tone mapping the encoded bit sequences on the aggregate-RU (or virtual-RU) basis by performing certain operations. For instance, processor 1312 may interleave, by an interleaver of processor 1312 (e.g., the vRU interleaver in design 400), the plurality of encoded bit sequences with respect to an aggregate of the plurality of RUs to provide a plurality of interleaved bit sequences. Additionally, processor 1312 may tone map, by a tone mapper of processor 1312 (e.g., the vRU tone mapper in design 400), the plurality of interleaved bit sequences with respect to the aggregate of the plurality of RUs to provide the plurality of processed bit sequences. Moreover, processor 1312 may parse, by a parser of processor 1312 (e.g., the RU parser in design 400), the plurality of processed bit sequences.

In some implementations, in interleaving the plurality of encoded bit sequences, processor 1312 may interleave, by a BCC interleaver of processor 1312 (e.g., the vRU interleaver in design 400), the plurality of encoded bit sequences with respect to one or more sizes of RUs with corresponding one or more interleaver parameters.

In some implementations, the one or more sizes of RUs may include a 26-tone RU and a 106-tone RU for a total of 132 data subcarriers (e.g., $N_{sd}$=132). In such cases, the one or more interleaver parameters may include a number of interleaver matrix columns being 21 (e.g., $N_{col}$=21) and a number of interleaver matrix rows being a multiple of 6 (e.g., $N_{row}$=6*a number of coded bits per single carrier for each spatial stream ($N_{bpscs}$)).

In some implementations, in tone mapping the plurality of interleaved bit sequences, processor 1312 may tone map, by an LDPC tone mapper of processor 1312 (e.g., the vRU tone mapper in design 400), the plurality of interleaved bit sequences with respect to one or more sizes of RUs with corresponding one or more tone mapper parameters.

In some implementations, the one or more sizes of RUs may include a 106-tone RU and a 26-tone RU. In such cases, the one or more tone mapper parameters comprise a distance between tones being 6 ($D_{TM}$=6).

In some implementations, the one or more sizes of RUs may include a 484-tone RU and a 242-tone RU. In such cases, the one or more tone mapper parameters comprise a distance between tones being 18 ($D_{TM}$=18).

In some implementations, in processing the plurality of encoded bit sequences, processor 1312 may interleave and tone mapping the encoded bit sequences on the individual-RU (or physical-RU) basis by performing certain operations. For instance, processor 1312 may parse, by a parser of processor 1312 (e.g., the RU parser in design 200), the plurality of encoded bit sequences to a plurality of interleavers of processor 1312 (e.g., the RU$_1$~RU$_n$ interleavers in design 200) each of which corresponding to a respective one of the plurality of RUs. Moreover, processor 1312 may interleave, by each of the plurality of interleavers, a respective encoded bit sequence from the plurality of encoded bit sequences to provide a respective interleaved bit sequence to a respective one of a plurality of tone mappers of processor 1312 (e.g., the RU$_1$~RU$_n$ tone mappers in design 200) each of which corresponding to a respective one of the plurality of RUs. Furthermore, processor 1312 may tone map, by each of the plurality of tone mappers, the respective interleaved bit sequence to provide a respective processed bit sequence of the plurality of processed bit sequences.

In some implementations, in parsing the plurality of encoded bit sequences, processor 1312 may parse the plurality of encoded bit sequences with respect to one or more sizes of RUs with corresponding interleaver parameters and tone mapper parameters.

In some implementations, the plurality of interleavers may include BCC interleavers. Moreover, the plurality of tone mappers may include LDPC tone mappers. In such cases, the interleaver parameters and the tone mapper parameters may include interleaver parameters and tone mapper parameters specified in IEEE 802.11ax specification for Wi-Fi (e.g., the parameters specified in Table 27-34 and Table 27-35 of the IEEE 802.11ax specification).

Under another proposed scheme pertaining to joint encoding schemes with interleaver and tone mapper for multi-RU operation in accordance with the present disclosure, with apparatus 1310 implemented in or as STA 110 and apparatus 1320 implemented in or as AP 120 associated with a BSS (e.g., BSS 130) of a wireless network such as a WLAN in network environment 100 in accordance with one or more of IEEE 802.11 standards, processor 1312 of apparatus 1310 may perform joint encoding of a plurality of information bits to generate a plurality of encoded bit sequences. Additionally, processor 1312 may process the plurality of encoded bit sequences by interleaving and tone mapping the encoded bit sequences with respect to a plurality of RUs allocated to apparatus 1310 (e.g., by apparatus 1320 as AP 120) on an aggregate-RU (or virtual-RU) basis to generate a plurality of processed bit sequences. For instance, processor 1312 may interleave, by an interleaver of processor 1312 (e.g., the vRU interleaver in design 400), the plurality of encoded bit sequences with respect to an aggregate of the plurality of RUs to provide a plurality of interleaved bit sequences. Additionally, processor 1312 may tone map, by a tone mapper of processor 1312 (e.g., the vRU tone mapper in design 400), the plurality of interleaved bit sequences with respect to the aggregate of the plurality of RUs to provide the plurality of processed bit sequences. Moreover, processor 1312 may parse, by a parser of processor 1312 (e.g., the RU parser in design 400), the plurality of processed bit sequences. Afterwards, processor 1312 may transmit, via transceiver 1316, the plurality of processed bit sequences to apparatus 1320 over the plurality of RUs.

In some implementations, in interleaving the plurality of encoded bit sequences, processor 1312 may interleave, by a BCC interleaver of processor 1312, the plurality of encoded bit sequences with respect to one or more sizes of RUs with corresponding one or more interleaver parameters.

In some implementations, the one or more sizes of RUs may include a 26-tone RU and a 106-tone RU for a total of 132 data subcarriers (e.g., $N_{sd}$=132). In such cases, the one or more interleaver parameters may include a number of interleaver matrix columns being 21 (e.g., $N_{col}$=21) and a number of interleaver matrix rows being a multiple of 6 (e.g., $N_{row}$=6*$N_{bpscs}$).

In some implementations, in tone mapping the plurality of interleaved bit sequences, processor 1312 may tone map, by an LDPC tone mapper of processor 1312, the plurality of interleaved bit sequences with respect to one or more sizes of RUs with corresponding one or more tone mapper parameters.

In some implementations, the one or more sizes of RUs may include a 106-tone RU and a 26-tone RU. In such cases, the one or more tone mapper parameters may include a distance between tones being 6 ($D_{TM}$=6).

In some implementations, the one or more sizes of RUs may include a 484-tone RU and a 242-tone RU. In such cases, the one or more tone mapper parameters may include a distance between tones being 18 ($D_{TM}$=18).

Under yet another proposed scheme pertaining to joint encoding schemes with interleaver and tone mapper for multi-RU operation in accordance with the present disclosure, with apparatus 1310 implemented in or as STA 110 and apparatus 1320 implemented in or as AP 120 associated with a BSS (e.g., BSS 130) of a wireless network such as a WLAN in network environment 100 in accordance with one or more of IEEE 802.11 standards, processor 1312 of apparatus 1310 may perform joint encoding of a plurality of information bits to generate a plurality of encoded bit sequences. Additionally, processor 1312 may process the plurality of encoded bit sequences by interleaving and tone mapping the encoded bit sequences with respect to a plurality of RUs allocated to apparatus 1310 (e.g., by apparatus 1320 as AP 120) on an individual-RU (or physical-RU) basis to generate a plurality of processed bit sequences. For instance, processor 1312 may parse, by a parser of processor 1312 (e.g., the RU parser in design 200), the plurality of encoded bit sequences to a plurality of interleavers of processor 1312 (e.g., the $RU_1$~$RU_n$ interleavers in design 200) each of which corresponding to a respective one of the plurality of RUs. Additionally, processor 1312 may interleave, by each of the plurality of interleavers, a respective encoded bit sequence from the plurality of encoded bit sequences to provide a respective interleaved bit sequence to a respective one of a plurality of tone mappers of processor 1312 (e.g., the $RU_1$~$RU_n$ tone mappers in design 200) each of which corresponding to a respective one of the plurality of RUs. Moreover, processor 1312 may tone map, by each of the plurality of tone mappers, the respective interleaved bit sequence to provide a respective processed bit sequence of the plurality of processed bit sequences. Afterwards, processor 1312 may transmit, via transceiver 1316, the plurality of processed bit sequences to apparatus 1320 over the plurality of RUs.

In some implementations, in parsing the plurality of encoded bit sequences, processor 1312 may parse the plurality of encoded bit sequences with respect to one or more sizes of RUs with corresponding interleaver parameters and tone mapper parameters.

In some implementations, the plurality of interleavers may include BCC interleavers. Moreover, the plurality of tone mappers may include LDPC tone mappers.

In some implementations, the interleaver parameters and the tone mapper parameters may include interleaver parameters and tone mapper parameters specified in IEEE 802.11ax specification for Wi-Fi (e.g., the parameters specified in Table 27-34 and Table 27-35 of the IEEE 802.11ax specification).

Illustrative Processes

Figure 14:
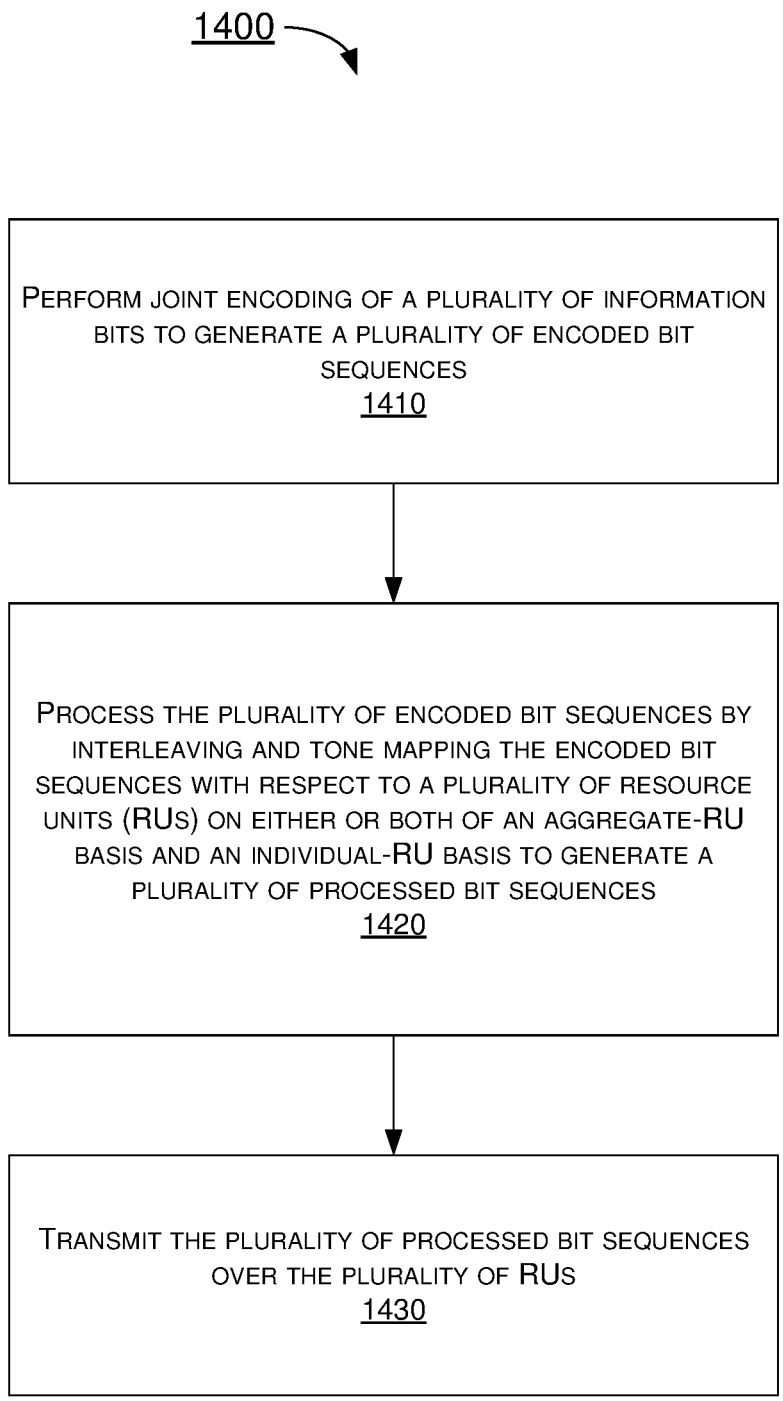
FIG. 14 is a flowchart of an example process in accordance with an implementation of the present disclosure.

FIG. 14 illustrates an example process 1400 in accordance with an implementation of the present disclosure. Process 1400 may represent an aspect of implementing various proposed designs, concepts, schemes, systems and methods described above. More specifically, process 1400 may represent an aspect of the proposed concepts and schemes pertaining to joint encoding schemes with interleaver and tone mapper for multi-RU operation in wireless communications in accordance with the present disclosure. Process 1400 may include one or more operations, actions, or functions as illustrated by one or more of blocks 1410, 1420 and 1430. Although illustrated as discrete blocks, various blocks of process 1400 may be divided into additional blocks, combined into fewer blocks, or eliminated, depending on the desired implementation. Moreover, the blocks/sub-blocks of process 1400 may be executed in the order shown in FIG. 14 or, alternatively in a different order. Furthermore, one or more of the blocks/sub-blocks of process 1400 may be executed repeatedly or iteratively. Process 1400 may be implemented by or in apparatus 1310 and apparatus 1320 as well as any variations thereof. Process 1400 may begin at block 1410.

At 1410, process 1400 may involve performing joint encoding of a plurality of information bits to generate a plurality of encoded bit sequences. Process 1400 may proceed from 1410 to 1420.

At 1420, process 1400 may involve processing the plurality of encoded bit sequences by interleaving and tone mapping the encoded bit sequences with respect to a plurality of RUs on either or both of an aggregate-RU basis and an individual-RU basis to generate a plurality of processed bit sequences. Process 1400 may proceed from 1420 to 1430.

At 1430, process 1400 may involve transmitting, via transceiver 1316, the plurality of processed bit sequences to apparatus 1320 over the plurality of RUs.

In some implementations, in processing the plurality of encoded bit sequences, process 1400 may involve interleaving and tone mapping the encoded bit sequences on the aggregate-RU basis by performing certain operations. For instance, process 1400 may involve interleaving the plurality of encoded bit sequences with respect to an aggregate of the plurality of RUs to provide a plurality of interleaved bit sequences. Additionally, process 1400 may involve tone mapping the plurality of interleaved bit sequences with respect to the aggregate of the plurality of RUs to provide the plurality of processed bit sequences. Moreover, process 1400 may involve parsing the plurality of processed bit sequences.

In some implementations, in interleaving the plurality of encoded bit sequences, process 1400 may involve interleaving the plurality of encoded bit sequences with respect to one or more sizes of RUs with corresponding one or more interleaver parameters.

In some implementations, the one or more sizes of RUs may include a 26-tone RU and a 106-tone RU for a total of 132 data subcarriers (e.g., $N_{sd}=132$). In such cases, the one or more interleaver parameters may include a number of interleaver matrix columns being 21 (e.g., $N_{col}=21$) and a number of interleaver matrix rows being a multiple of 6 (e.g., $N_{row}=6*N_{bpscs}$).

In some implementations, in tone mapping the plurality of interleaved bit sequences, process 1400 may involve tone mapping the plurality of interleaved bit sequences with respect to one or more sizes of RUs with corresponding one or more tone mapper parameters.

In some implementations, the one or more sizes of RUs may include a 106-tone RU and a 26-tone RU. In such cases, the one or more tone mapper parameters comprise a distance between tones being 6 ($D_{TM}=6$).

In some implementations, the one or more sizes of RUs may include a 484-tone RU and a 242-tone RU. In such cases, the one or more tone mapper parameters comprise a distance between tones being 18 ($D_{TM}=18$).

In some implementations, in processing the plurality of encoded bit sequences, process 1400 may involve interleaving and tone mapping the encoded bit sequences on the individual-RU basis by performing certain operations. For instance, process 1400 may involve parsing, by a parser of processor 1312, the plurality of encoded bit sequences to a plurality of interleavers of processor 1312 each of which corresponding to a respective one of the plurality of RUs. Moreover, process 1400 may involve interleaving, by each of the plurality of interleavers, a respective encoded bit sequence from the plurality of encoded bit sequences to provide a respective interleaved bit sequence to a respective one of a plurality of tone mappers of processor 1312 each of which corresponding to a respective one of the plurality of RUs. Furthermore, process 1400 may involve tone mapping, by each of the plurality of tone mappers, the respective interleaved bit sequence to provide a respective processed bit sequence of the plurality of processed bit sequences.

In some implementations, in parsing the plurality of encoded bit sequences, process 1400 may involve parsing the plurality of encoded bit sequences with respect to one or more sizes of RUs with corresponding interleaver parameters and tone mapper parameters.

In some implementations, the plurality of interleavers may include BCC interleavers. Moreover, the plurality of tone mappers may include LDPC tone mappers. In such cases, the interleaver parameters and the tone mapper parameters may include interleaver parameters and tone mapper parameters specified in IEEE 802.11ax specification for Wi-Fi (e.g., the parameters specified in Table 27-34 and Table 27-35 of the IEEE 802.11ax specification).

FIG. 15 illustrates an example process 1500 in accordance with an implementation of the present disclosure. Process 1500 may represent an aspect of implementing various proposed designs, concepts, schemes, systems and methods described above. More specifically, process 1500 may represent an aspect of the proposed concepts and schemes pertaining to joint encoding schemes with interleaver and tone mapper for multi-RU operation in wireless communications in accordance with the present disclosure. Process 1500 may include one or more operations, actions, or functions as illustrated by one or more of blocks 1510, 1520 and 1530 as well as sub-blocks 1522, 1524 and 1526. Although illustrated as discrete blocks, various blocks of process 1500 may be divided into additional blocks, combined into fewer blocks, or eliminated, depending on the desired implementation. Moreover, the blocks/sub-blocks of process 1500 may be executed in the order shown in FIG. 15 or, alternatively in a different order. Furthermore, one or more of the blocks/sub-blocks of process 1500 may be executed repeatedly or iteratively. Process 1500 may be implemented by or in apparatus 1310 and apparatus 1320 as well as any variations thereof. Solely for illustrative purposes and without limiting the scope, process 1500 is described below in the context of apparatus 1310 implemented in or as STA 110 and apparatus 1320 implemented in or as AP 120 of a wireless network such as a WLAN in network environment 100 in accordance with one or more of IEEE 802.11 standards. Process 1500 may begin at block 1510.

At 1510, process 1500 may involve processor 1312 of apparatus 1310 performing joint encoding of a plurality of information bits to generate a plurality of encoded bit sequences. Process 1500 may proceed from 1510 to 1520.

At 1520, process 1500 may involve processor 1312 processing the plurality of encoded bit sequences by interleaving and tone mapping the encoded bit sequences with respect to a plurality of RUs allocated to apparatus 1310 (e.g., by apparatus 1320 as AP 120) on an aggregate-RU basis to generate a plurality of processed bit sequences, as represented by 1522, 1524 and 1526. Process 1500 may proceed from 1520 to 1530.

At 1530, process 1500 may involve processor 1312 transmitting, via transceiver 1316, the plurality of processed bit sequences to apparatus 1320 over the plurality of RUs.

At 1522, process 1500 may involve processor 1312 interleaving, by an interleaver of processor 1312, the plurality of encoded bit sequences with respect to an aggregate of the plurality of RUs to provide a plurality of interleaved bit sequences. Process 1500 may proceed from 1522 to 1524.

At 1524, process 1500 may involve processor 1312 tone mapping, by a tone mapper of processor 1312, the plurality of interleaved bit sequences with respect to the aggregate of the plurality of RUs to provide the plurality of processed bit sequences. Process 1500 may proceed from 1524 to 1526.

At 1526, process 1500 may involve processor 1312 parsing, by a parser of processor 1312, the plurality of processed bit sequences.

In some implementations, in interleaving the plurality of encoded bit sequences, process 1500 may involve processor 1312 interleaving, by a BCC interleaver of processor 1312, the plurality of encoded bit sequences with respect to one or more sizes of RUs with corresponding one or more interleaver parameters.

In some implementations, the one or more sizes of RUs may include a 26-tone RU and a 106-tone RU for a total of 132 data subcarriers (e.g., $N_{sd}=132$). In such cases, the one or more interleaver parameters may include a number of interleaver matrix columns being 21 (e.g., $N_{col}=21$) and a number of interleaver matrix rows being a multiple of 6 (e.g., $N_{row}=6*N_{bpscs}$).

In some implementations, in tone mapping the plurality of interleaved bit sequences, process 1500 may involve processor 1312 tone mapping, by an LDPC tone mapper of processor 1312, the plurality of interleaved bit sequences with respect to one or more sizes of RUs with corresponding one or more tone mapper parameters.

In some implementations, the one or more sizes of RUs may include a 106-tone RU and a 26-tone RU. In such cases, the one or more tone mapper parameters may include a distance between tones being 6 ($D_{TM}=6$).

In some implementations, the one or more sizes of RUs may include a 484-tone RU and a 242-tone RU. In such cases, the one or more tone mapper parameters may include a distance between tones being 18 ($D_{TM}=18$).

FIG. 16 illustrates an example process 1600 in accordance with an implementation of the present disclosure. Process 1600 may represent an aspect of implementing various proposed designs, concepts, schemes, systems and methods described above. More specifically, process 1600 may represent an aspect of the proposed concepts and schemes pertaining to joint encoding schemes with interleaver and tone mapper for multi-RU operation in wireless communications in accordance with the present disclosure. Process 1600 may include one or more operations, actions, or functions as illustrated by one or more of blocks 1610, 1620 and 1630 as well as sub-blocks 1622, 1624 and 1626. Although illustrated as discrete blocks, various blocks of process 1600 may be divided into additional blocks, combined into fewer blocks, or eliminated, depending on the desired implementation. Moreover, the blocks/sub-blocks of process 1600 may be executed in the order shown in FIG. 16 or, alternatively in a different order. Furthermore, one or more of the blocks/sub-blocks of process 1600 may be executed repeatedly or iteratively. Process 1600 may be implemented by or in apparatus 1310 and apparatus 1320 as well as any variations thereof. Solely for illustrative purposes and without limiting the scope, process 1600 is described below in the context of apparatus 1310 implemented in or as STA 110 and apparatus 1320 implemented in or as AP 120 of a wireless network such as a WLAN in network environment 100 in accordance with one or more of IEEE 802.11 standards. Process 1600 may begin at block 1610.

At 1610, process 1600 may involve processor 1312 of apparatus 1310 performing joint encoding of a plurality of information bits to generate a plurality of encoded bit sequences. Process 1600 may proceed from 1610 to 1620.

At 1620, process 1600 may involve processor 1312 processing the plurality of encoded bit sequences by interleaving and tone mapping the encoded bit sequences with respect to a plurality of RUs allocated to apparatus 1310 (e.g., by apparatus 1320 as AP 120) on an individual-RU basis to generate a plurality of processed bit sequences, as represented by 1622, 1624 and 1626. Process 1600 may proceed from 1620 to 1630.

At 1630, process 1600 may involve processor 1312 transmitting, via transceiver 1316, the plurality of processed bit sequences to apparatus 1320 over the plurality of RUs.

At 1622, process 1600 may involve processor 1312 parsing, by a parser of processor 1312, the plurality of encoded bit sequences to a plurality of interleavers of processor 1312 each of which corresponding to a respective one of the plurality of RUs. Process 1600 may proceed from 1622 to 1624.

At 1624, process 1600 may involve processor 1312 interleaving, by each of the plurality of interleavers, a respective encoded bit sequence from the plurality of encoded bit sequences to provide a respective interleaved bit sequence to a respective one of a plurality of tone mappers of processor 1312 each of which corresponding to a respective one of the plurality of RUs. Process 1600 may proceed from 1624 to 1626.

At 1626, process 1600 may involve processor 1312 tone mapping, by each of the plurality of tone mappers, the respective interleaved bit sequence to provide a respective processed bit sequence of the plurality of processed bit sequences.

In some implementations, in parsing the plurality of encoded bit sequences, process 1600 may involve processor 1312 parsing the plurality of encoded bit sequences with respect to one or more sizes of RUs with corresponding interleaver parameters and tone mapper parameters.

In some implementations, the plurality of interleavers may include BCC interleavers. Moreover, the plurality of tone mappers may include LDPC tone mappers.

In some implementations, the interleaver parameters and the tone mapper parameters may include interleaver parameters and tone mapper parameters specified in IEEE 802.11ax specification for Wi-Fi (e.g., the parameters specified in Table 27-34 and Table 27-35 of the IEEE 802.11ax specification).

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
performing joint encoding of a plurality of information bits to provide a plurality of encoded bits;
processing the plurality of encoded bits by interleaving and tone mapping the encoded bits with respect to a plurality of resource units (RUs) on an aggregate-RU basis to generate a plurality of processed bits by:
  interleaving the plurality of encoded bits with respect to an aggregate of the plurality of RUs by interleaving, using a binary convolutional coding (BCC) interleaver, the plurality of encoded bits with respect to one or more sizes of RUs with corresponding one or more interleaver parameters; and
  tone mapping with respect to the aggregate of the plurality of RUs to provide the plurality of processed bits; and
transmitting the plurality of processed bits over the plurality of RUs,
wherein the one or more sizes of RUs comprise a 26-tone RU and a 106-tone RU for a total of 132 data subcarriers, and
wherein the one or more interleaver parameters comprise a number of interleaver matrix columns being 21 and a number of interleaver matrix rows being a multiple of 6.

2. A method, comprising:
performing joint encoding of a plurality of information bits to provide a plurality of encoded bits;
processing the plurality of encoded bits by interleaving and tone mapping the encoded bits with respect to a plurality of resource units (RUs) on an aggregate-RU basis to generate a plurality of processed bits by:
  interleaving the plurality of encoded bits with respect to an aggregate of the plurality of RUs; and
  tone mapping with respect to the aggregate of the plurality of RUs to provide the plurality of processed bits by tone mapping, using a low-density parity-check (LDPC) tone mapper, with respect to one or more sizes of RUs with corresponding one or more tone mapper parameters; and
transmitting the plurality of processed bits over the plurality of RUs,
wherein the one or more sizes of RUs comprise a 106-tone RU and a 26-tone RU, and
wherein the one or more tone mapper parameters comprise a distance between tones being 6.

3. A method, comprising:
performing joint encoding of a plurality of information bits to generate a plurality of encoded bits;
processing the plurality of encoded bits by interleaving and tone mapping the encoded bits with respect to a plurality of resource units (RUs) on an aggregate-RU basis to generate a plurality of processed bits by interleaving and tone mapping the encoded bits on the aggregate-RU basis by:
  interleaving the plurality of encoded bits with respect to an aggregate of the plurality of RUs; and
  tone mapping with respect to the aggregate of the plurality of RUs to provide the plurality of processed bits by tone mapping, using a low-density parity-check (LDPC) tone mapper, with respect to one or more sizes of RUs with corresponding one or more tone mapper parameters; and transmitting the plurality of processed bits over the plurality of RUs, wherein the one or more sizes of RUs comprise a 484-tone RU and a 242-tone RU, and wherein the one or more tone mapper parameters comprise a distance between tones being 18.

4. A method, comprising:

performing, by a processor of an apparatus, joint encoding of a plurality of information bits to provide a plurality of encoded bits; and processing, by the processor, the plurality of encoded bits by interleaving and tone mapping the encoded bits with respect to a plurality of resource units (RUs) allocated to the apparatus on an aggregate-RU basis to generate a plurality of processed bits by:

interleaving, by an interleaver of the processor, the plurality of encoded bits with respect to an aggregate of the plurality of RUs; and tone mapping, by a tone mapper of the processor, with respect to the aggregate of the plurality of RUs to provide the plurality of processed bits.

5. The method of claim 4, wherein the interleaving of the plurality of encoded bits comprises interleaving, by a binary convolutional coding (BCC) interleaver, the plurality of encoded bits with respect to one or more sizes of RUs with corresponding one or more interleaver parameters.

6. The method of claim 5, wherein the one or more sizes of RUs comprise a 26-tone RU and a 106-tone RU for a total of 132 data subcarriers, and wherein the one or more interleaver parameters comprise a number of interleaver matrix columns being 21 and a number of interleaver matrix rows being a multiple of 6.

7. The method of claim 4, wherein the tone mapping comprises tone mapping, by a low-density parity-check (LDPC) tone mapper, with respect to one or more sizes of RUs with corresponding one or more tone mapper parameters.

8. The method of claim 7, wherein the one or more sizes of RUs comprise a 106-tone RU and a 26-tone RU, and wherein the one or more tone mapper parameters comprise a distance between tones being 6.

9. The method of claim 7, wherein the one or more sizes of RUs comprise a 484-tone RU and a 242-tone RU, and wherein the one or more tone mapper parameters comprise a distance between tones being 18.

* * * * *